United States Patent
Hong

Patent Number: 6,129,767
Date of Patent: Oct. 10, 2000

[54] LOW TEMPERATURE, LOW BATH RATIO, TENSIONLESS, AND SHORT-TERM DYEING METHOD AND DEVICE USING MICROWAVES

[75] Inventor: Seok Min Hong, Kyungbuk, Rep. of Korea

[73] Assignee: Dongbo Textile, Rep. of Korea

[21] Appl. No.: 09/100,419

[22] Filed: Jun. 20, 1998

[30] Foreign Application Priority Data

Sep. 10, 1997 [KR] Rep. of Korea ........................ 97-46590

[51] Int. Cl.[7] ...................................................... D06B 3/12
[52] U.S. Cl. .......................... 8/151; 68/20; 68/28; 68/177
[58] Field of Search ........................ 8/151, 151.1; 68/20, 68/5 D, 28, 177

[56] References Cited

U.S. PATENT DOCUMENTS

| | | |
|---|---|---|
| 3,879,966 | 4/1975 | Worth et al. . |
| 4,348,203 | 9/1982 | Skelly et al. . |
| 4,494,956 | 1/1985 | Schafer et al. . |
| 5,074,888 | 12/1991 | Topfl et al. . |
| 5,076,809 | 12/1991 | Bouglas . |
| 5,147,410 | 9/1992 | Heindl et al. . |
| 5,273,551 | 12/1993 | Brehme et al. . |
| 5,358,537 | 10/1994 | Kelly et al. . |
| 5,512,061 | 4/1996 | Von Der Eltz et al. . |
| 5,679,115 | 10/1997 | Fritzsche et al. . |
| 5,779,737 | 7/1998 | Potter et al. . |
| 5,810,890 | 9/1998 | Russ et al. . |

OTHER PUBLICATIONS

Tyrone L. Vigo, Textile Processing and Properties: Preparation, Dyeing, Finishing and Performance. Elsevier Science B.V., Amsterdam, 1994, pp. 132–140, 166–174.

"Functional Fibers: Trends in Technology and Product Development in Japan," Toray Research Center, Inc., pp. 258, 299. Admitted prior art.

Jose Cegarra, et al.: "The Dyeing of Textile Materials," Texilia, 1992, pp. 638–649.

*Primary Examiner*—Frankie L. Stinson
*Attorney, Agent, or Firm*—Browning Bushman

[57] ABSTRACT

A low temperature, low bath ratio, tensionless and short-term dyeing method using microwaves, comprises the steps of: immersing dyed goods in a vessel filled with dye solution comprising water present in an amount twice as much as the goods to be dyed, a disperse dye present in a ratio of disperse dye to goods to be dyed of 1:1000, a dispersing agent present in a ratio of dispersing agent to dye of below 1:100, and irradiating the dyed goods with microwaves below 2450 MHZ in order to heat them to a temperature of 100–130° C.

4 Claims, 3 Drawing Sheets

LOW TEMPERATURE, LOW BATH RATIO, TENSIONLESS, AND SHORT-TERM DYEING METHOD AND DEVICE USING MICROWAVES

BACKGROUND OF THE INVENTION

1. Field of the Invention

The present invention relates to a dyeing method and apparatus. More particularly, it relates to a low temperature, low bath ratio, tensionless, and short-term dyeing method and device therefor using microwaves.

2. Description of the Prior Art

In a conventional dyeing method, industrial water in an amount of ten to twenty times as much as the dyed goods is used as the medium for dyeing, resulting in much wasted water, serious pollution problems, and loss of dyes in that 5–10% by weight of dye is contained in the waste water. In addition, a lot of time is spent in dyeing, namely, one to three hours, and the large volume of industrial water is heated to 100–130° C., causing the consumption of much heat energy, thereby increasing the cost of production. In the case of dyeing a fabric, especially, warpwise tension occurs. Dyed mixed yarns have different shrinkage, and high shrinkage raw fabrics have no elasticity and thickness and are rough to the touch.

SUMMARY OF THE INVENTION

Accordingly, the present invention is directed to a low temperature, low bath ratio, tensionless and short-term dyeing method and device using microwaves that substantially obviates one or more of the problems due to limitations and disadvantages of the related art.

An object of the present invention is to provide a dyeing method and a device that can reduce water consumption, time, and heat energy and provide good elasticity, thickness and touch.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof, as well as the appended drawings.

To achieve these and other advantages and in accordance with the purpose of the present invention, as embodied and broadly described, the dyeing method comprises the steps of: immersing goods to be dyed in a container filled with a disperse dye solution in which water is present in an amount of twice as much as the goods to be dyed. In the dye solution, the ratio of dispersed dyes to goods to be dyed is 1:1000, and the ratio of dispersing agent to dye is 1:100 or less. The dye solution is stirred. The dyed goods, which contain about 80% by weight (based on the weight of the goods to be dyed) are subjected to irradiating microwaves below 2450 MHZ to heat them to about 100–130° C. to dehydrate the dyed goods to have about 80% by weight dye solution.

The present invention includes the method of continuously feeding, immersing, squeezing, and padding goods to be dyed in a container or bath filled with dye solution comprising water present in an amount of twice as much as the goods to be dyed; a ratio of dispersed dyes to goods to be dyed of 1:1000 and a ratio of dispersing agent to dyes below 1:100. Irradiating microwaves are applied to the dyed goods, in order to heat them to about 100–130° C., while the fabric is maintained in a tensionless state, turning on rollers continuously being fed and discharged from the process before being washed, finally tendered, and cool-wound.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

FIG. 1 depicts a batch yarn dyeing device of the present invention wherein:

Figure 1:
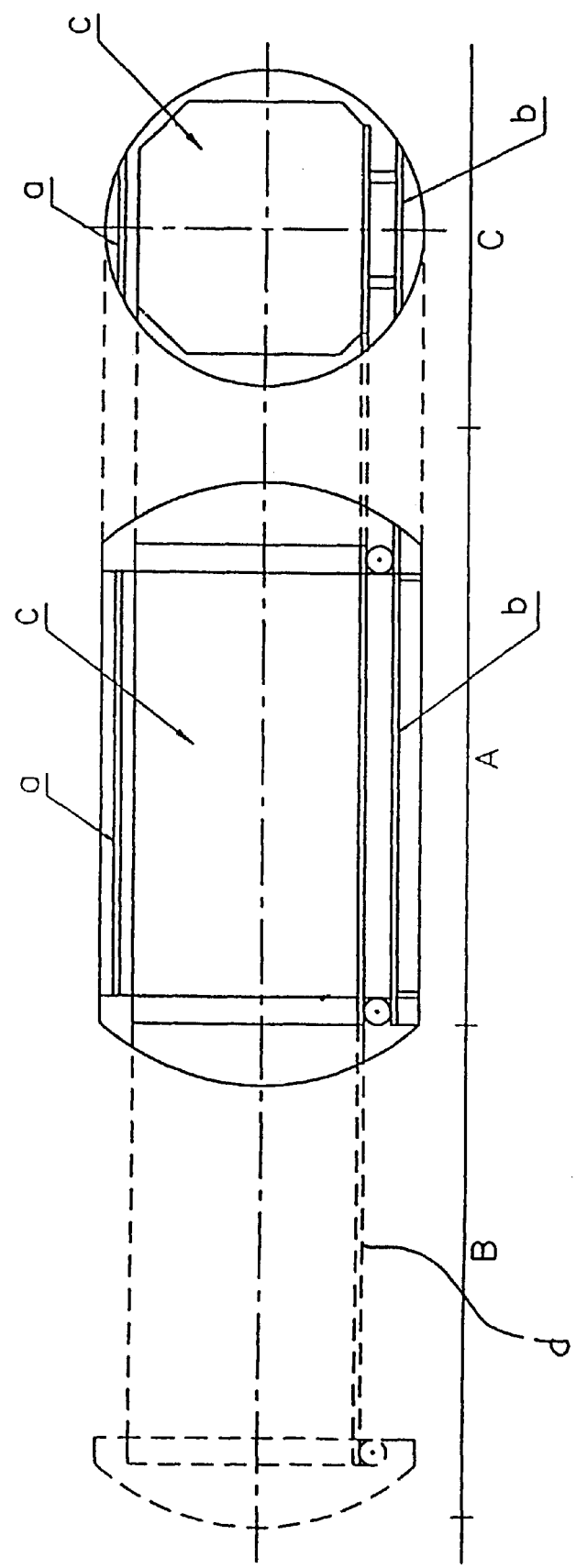

Zone A of FIG. 1 shows a main body of the batch yarn dyeing device;

Zone B of FIG. 1 shows a state in which the device is uncovered, after completion of dyeing at the Zone A; and Zone C of FIG. 1 is a cross-sectional view of the device.

Figure 2:
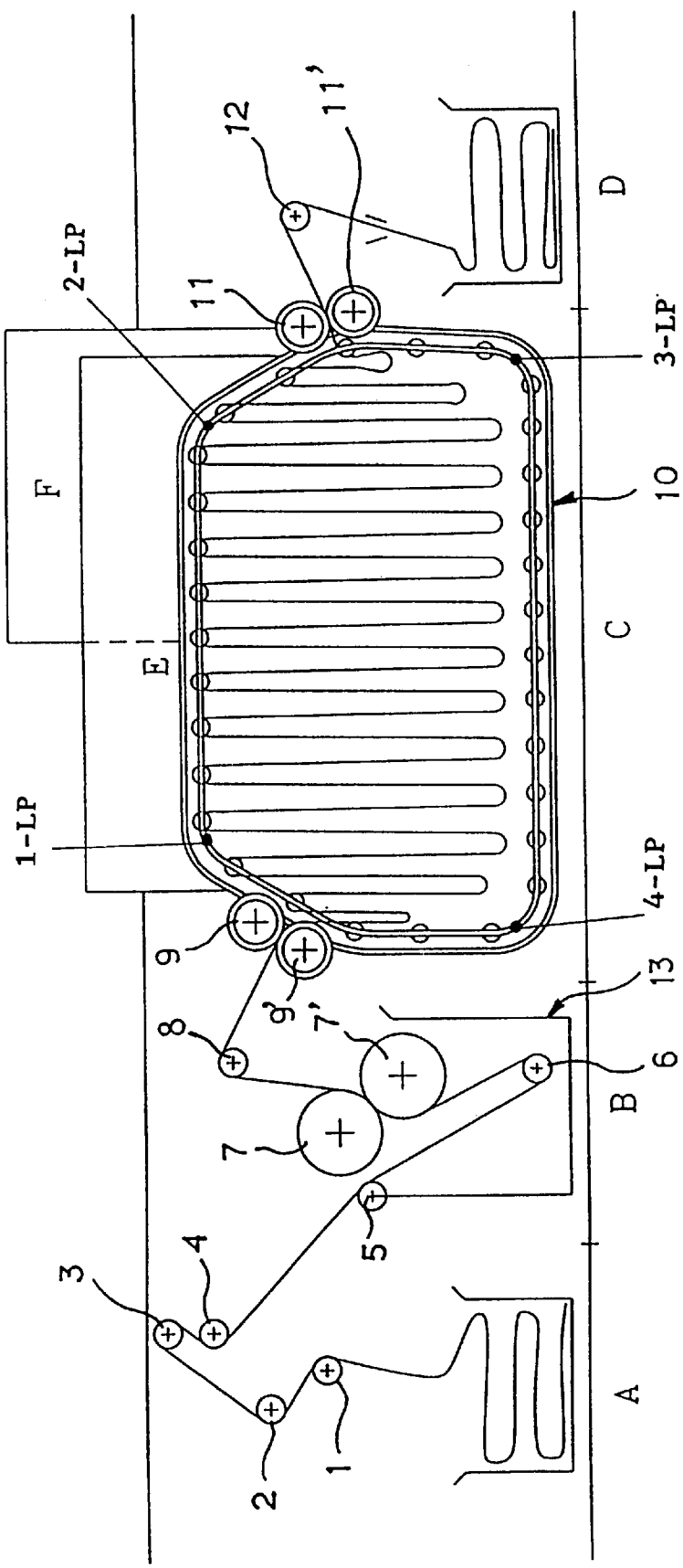
Figure 3:
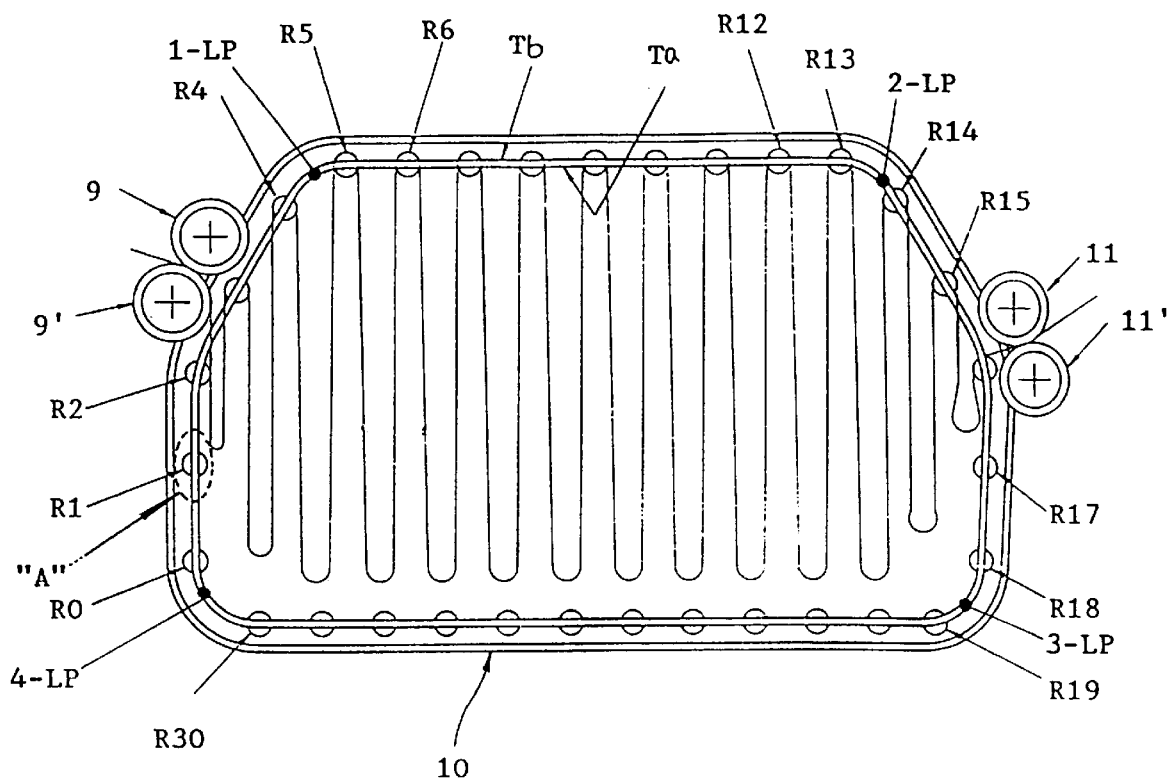

FIG. 2 depicts an overall continuous fabric dyeing device of the present invention wherein:

Zone A of FIG. 2 shows a method of dispensing fabric to be dyed;

Zone B of FIG. 2 shows that the fabric to be dyed is immersed, squeezed, and padded in dye solution including water, dyes, and dispersing agent;

Zone C of FIG. 2 is a partial sectional view, showing the dyed fabric being irradiated with microwaves to be dried, while being put on rollers and turning in a tensionless state;

Zone D of FIG. 2 is a sectional view, showing the dyed fabric being collected;

FIG. 3 is a detailed sectional view of the Zone C of FIG. 2; and

Figure 4:
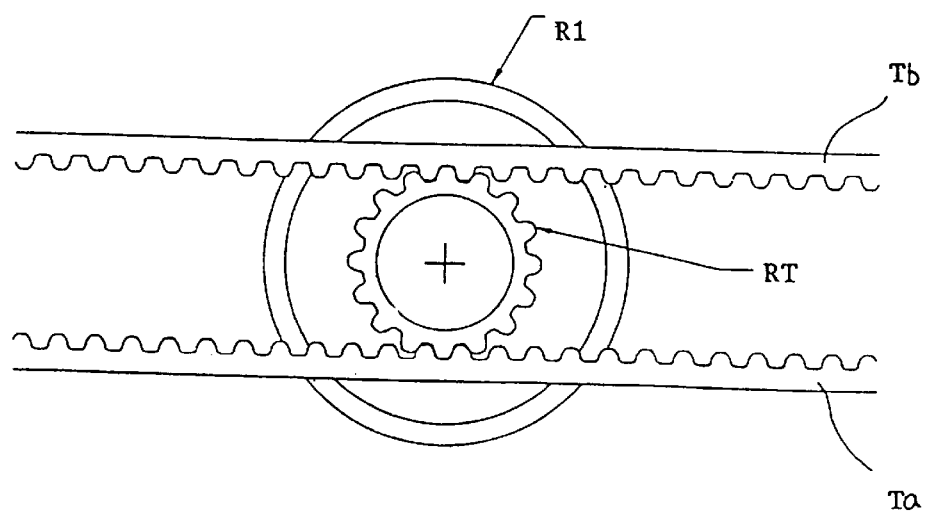

FIG. 4 is an enlarged sectional view of "A" of FIG. 3, showing a toothed gear that is attached to an outside toothed belt, an inside toothed belt and a roller as shown in FIG. 2 or FIG. 3.

DETAILED DESCRIPTION OF PREFERRED EMBODIMENT

Reference will now be made in detail to the preferred embodiments of the present invention, examples of which are illustrated in the accompanying drawings.

FIG. 1 illustrates a batch device for dyeing a yarn, and Zone A of FIG. 1 is a main body of microwaves of the present invention. Reference symbols "a" and "b" refer to reactors, and "C" to a yarn that is be dyed.

Zone B of FIG. 1 shows a state in which the device is uncovered, after completion of dyeing in the Zone A. This state is the same as the yarn is, at first, mounted. Zone C of FIG. 1 is a cross-sectional view of the Zone A.

The yarn is mounted on the bottom d at the Zone B of FIG. 1 and pushed into the Zone A, thereby getting ready for being dyed. After completion of dyeing, the yarn is taken out in the reverse way.

FIG. 2 shows a device for continuously dyeing a fabric. Zone A of FIG. 2 depicts a state of feeding fabric to be dyed. As shown in Zone B of FIG. 2, the fabric is immersed in a vessel 13 filled with a bath of dye solution comprising water, dyes and dispersing agent wherein it is squeezed and padded by squeezing rollers 7 and 7'. Thereafter, the wet, dyed fabric is continuously conveyed to Zone C of FIG. 2.

Zone C of FIG. 2 shows a kettle 10 for dyeing, and reference symbol "F" refers to a microwave oscillator. As shown in FIG. 3, the fabric is conveyed by guide rollers 9 and 9' and is, without tension, put on roller R0-roller R30 and turned, to be dyed and dried, and then conveyed to Zone D of FIG. 2 by guide rollers 11 and 11', thereby finishing the fabric dyeing.

FIG. 3 is a detailed view of the Zone C of FIG. 2.

FIG. 4 is a magnified view of "A" of FIG. 3, showing a toothed gear RT, which is attached to an outside toothed belt Tb, an inside toothed belt Ta and roller of FIG. 3. This also shows roller R0-roller R30, namely, the movement state of the rollers. The rollers increase and/or decrease, if necessary. The outside and inside toothed belts Tb and Ta serve to convey the dyed fabric that is put on the roller R1, to the guide rollers 11 and 11', and get it back to the roller R1. When the outside belt Tb moves to the right while the inside belt Ta is fixed, the roller R1 also moves to the right as much as the outside belt Tb. When the outside and inside belts Tb and Ta simultaneously move to the right at the same speed, the roller R1 also moves to the right as much as the outside and inside belts Tb and Ta, not turning on its axis. When the outside belt Tb and the inside belt Ta move right and left, respectively, at the same speed, the roller R1 only turns on its axis, not moving right and/or left. By this principle, the dyed fabric is put on the rollers R0–R30, and its movement speed can be controlled. The toothed belts are divided into four groups.

Four pairs of the inside and outside belts are installed at the top, bottom, right and left, to gain the respective independences. That is to say, the respective inside and outside toothed belts of the first group of rollers R0–R4, the second group of rollers R5–R13, the third group of rollers R14–R18, and the fourth group of rollers R19–R30, are able to move in the same or different direction as one another.

In addition, a linear velocity of the guide rollers 9 and 9' should be in accordance with that of the rollers R1–R4 using the inside and outside belts of the first group. Because the rollers move to the second group, not fixed and turning on their axes, further linear velocity is required for adding the moving distance of the rollers.

When a roller R4 arrives at a movement limit point 1-LP of the first group's inside and outside toothed belts, it moves to a movement limit point 2-LP of the second group's inside and outside toothed belts.

Here, when the dyed fabric moves in every direction, and is then irradiated with electromagnetic waves, a dye stain is taken out of the fabric, and the dyed fabric is, with no tension, conveyed from the guide rollers 9 and 9' to the guide rollers 11 and 11' so that the rollers R0–R30 revolve, turning on their axes.

Non-limiting examples of disperse dyes include Kayalon PET Rubine GLSE, CI Disperse RED 60, Celliton, Cibacet, Miketon, Foron, Resoline, Latyl, Duranol, Dispersol, Diapolon, etc. Dispersing agents include hydrophilic carriers such as phenol derivatives, salicylic acid derivatives, benzoic acid derivatives, etc., and hydrophobic carriers such as di-phenyl, chloro benzol, naphthalene, o- or p-phenyl phenol, benzol, etc., the choice of dispersing agent depending on the type of fiber being dyed.

After dyeing, about 80% by weight or more, based on the dyed fabric, of dye solution remains on the dyed fabric. The fiber itself and purified water (distilled water) are not a dielectric material or dielectric. They are poor dielectrics. However, the dye solution is a dielectric, comprising dyes, water, and dispersing agent. The higher the dielectric constant, the more microwaves the dielectric will absorb. Therefore, the dye solution contained in the dyed goods serves to cause an inside heating of the dyed fabric induced by the microwaves.

The optimum temperature for drying is about 100–130° C. If the dyed yarn or fabric is dried in a conventional manner, no inside heating of the fabric occurs. By using high frequency, microwaves sufficient for drying the dyed goods, however, such inside drying does occur. The heating temperature range depends on the intensity of the microwave, the dielectric nature of the dyed goods, and the time of irradiation.

The time of irradiating microwaves varies according to the thickness of fabric, the concentration and quantity of dye solution, the shades of color, the kinds of yarn, the texture of fabric, the quantity of fabric being dyed, the frequency of the microwaves, etc. In the case of dyeing the fabric, the dyed goods are immersed in the kettle and irradiated for about 30–120 seconds. If the dyed goods are immersed in the kettle for less than about 30 seconds, dyeing is insufficient due to insufficient or internal heating.

It will be apparent to those skilled in the art that various modifications and variations can be made in a low temperature, low bath ratio, tensionless and short-term dyeing method using microwaves and its device of the present invention without departing from the spirit or scope of the invention. Thus, it is intended that the present invention cover the modifications and variations of this invention provided they come within the scope of the appended claims and their equivalents.

EXAMPLE 1

Yarn Dyeing (Batch System)

Cheesecloth in which polyester 150d/48F, DTY yarn is softly wound, is scoured, while the polyester yarn is electrically scoured for about 10 minutes and then immersed in a dye solution containing water in an amount twice as much as the dyed goods. The dye solution contained a ratio of Kayalon PFT Rubine GLSE dye to dyed goods of 1:1000 and a ratio of phenol carrier (dispersing agent) to dye of 1:120. The dye solution and goods to be dyed are stirred together. Thereafter, the dyed goods are dehydrated to have about 80% by weight dye solution based on the dyed goods and then pushed into the Zone A of FIG. 1, being mounted on the bottom d of FIG. 1 and irradiated with microwaves of about 2000 MHZ from a microwaves oscillator, in order to be heated to 130° C. for about 10 minutes and further dried at about 100° C. for about 5 minutes. This completes the yarn dyeing.

EXAMPLE 2

Fabric Dyeing (Continuous System)

Polyester taffeta undergoes a known scouring process and is then presetted, while the dyed goods are put into the Zone B from the Zone A of FIG. 2. In Zone B, a dye solution as described in Example 1 is continuously poured into the container 13. The dyed fabric is designed to pass from guide rollers 1, 2, 3, 4 and 5, to an immersing roller 6 and the squeezing rollers 7 and 7' for about 1–3 seconds, being immersed in the dye solution. The dyed fabric is squeezed and padded by the squeezing rollers 7 and 7', until the pick-up of the dye solution by the fabric amounts to 100% by weight in quantity based on the fabric weight. Thereafter, the dyed fabric passes through the guide rollers 9 and 9', before coming into the Zone C. The dyed fabric is continuously fed and discharged, passing by the rollers R0–R30 in the kettle 10 for dyeing at a temperature of 100–130° C., which is achieved by being irradiated with microwaves of about 2000 MHZ from a microwaves oscillator. Here, the dyed fabric is irradiated with no tension.

The dyed fabric which is discharged, goes through a known washing process and a final tendering, before being cool-wound, thereby completing the fabric dyeing.

EFFECT OF THE INVENTION

As described above, water that is used as a medium for dyes is vaporized in the process of dyeing, resulting in no dyeing waste water. There is used no post dye solution so that no dyeing waste water is generated. In addition, the time, dyes and heat energy required for dyeing can be reduced to thereby decrease the cost of production. The dyed goods are dyed in a tensionless state, so that they are excellent in quality, with good elasticity, thickness and touch.

What is claimed is:

1. A low temperature, low bath ratio, tensionless and short-term yarn dyeing method using microwaves, comprising the steps of:

immersing goods to be dyed in a bath filled with a dye solution comprising water present in an amount twice as much as the goods to be dyed, a disperse dye present in a ratio of dye to goods to be dyed of 1:1000, and a dispersing agent present in a ratio of dispersing agent to dye of less than 1:100 to produce wet dyed goods; and irradiating the wet dyed goods with microwaves in order to heat them to a temperature of about 100° C. to about 130° C. to dry the dyed goods.

2. The method as set forth in claim 1, wherein the dyed goods are, for about 10 minutes, immersed in the dye solution.

3. The method as set forth in claim 1, wherein the dyed goods are irradiated with the microwaves to be dried for about 5 minutes.

4. A low temperature, low bath ratio, tensionless and short-term continuous fabric dyeing method using microwaves, comprising the steps of:

preparing a bath of a dye solution comprising water present in an amount twice as much as the goods to be dyed, a disperse dye present in a ratio of dye to goods to be dyed of 1:1000, and a dispersing agent present in a ratio of dispersing agent to dye of less than 1:100 and continuously immersing fabric to be dyed in the bath, before squeezing and padding it until the dye solution amounts to 80–100 % by weight of the dyed goods, said fabric to be dyed being continuously fed to and discharged from the bath, the fabric being continuously fed to and discharged from the bath, the fabric being continuously passed through a drying stage in a tensionless state and dried by microwaves at a temperature of about 100–130° C..

\* \* \* \* \*

UNITED STATES PATENT AND TRADEMARK OFFICE
CERTIFICATE OF CORRECTION

PATENT NO. : 6,129,767
DATED : October 10, 2000
INVENTOR(S) : Seok Min Hong

It is certified that error appears in the above-identified patent and that said Letters Patent is hereby corrected as shown below:

Title page and column 1,
Line 3, delete "and Device".

Signed and Sealed this

Eleventh Day of September, 2001

Attest:

*Nicholas P. Godici*

NICHOLAS P. GODICI
*Attesting Officer*    *Acting Director of the United States Patent and Trademark Office*